United States Patent [19]

Hoximeier et al.

[11] Patent Number: 5,369,175
[45] Date of Patent: Nov. 29, 1994

[54] METHOD FOR PREPARING ASYMMETRIC RADIAL COPOLYMERS HAVING FOUR FIRST ARMS AND TWO SECOND ARMS

[75] Inventors: Ronald J. Hoximeier; Bridget A. Spence; Steven S. Chin, all of Houston, Tex.

[73] Assignee: Shell Oil Company, Houston, Tex.

[21] Appl. No.: 149,598

[22] Filed: Nov. 9, 1993

[51] Int. Cl.⁵ ................. C08L 53/02; C08F 297/04
[52] U.S. Cl. ................................ 525/99; 525/105; 525/314
[58] Field of Search ................. 525/314, 105, 99

[56] References Cited

U.S. PATENT DOCUMENTS

| | | | |
|---|---|---|---|
| 3,150,209 | 9/1964 | Short et al. | 525/194 |
| 3,281,383 | 10/1966 | Zelinski et al. | 525/122 |
| 3,496,154 | 2/1970 | Wofford | 526/174 |
| 3,498,960 | 3/1970 | Wofford | 526/180 |
| 3,598,884 | 8/1971 | Wei | 525/89 |
| 3,639,517 | 2/1972 | Kitchen et al. | 525/92 |
| 3,646,161 | 2/1972 | Marwede et al. | 525/314 |
| 3,985,830 | 10/1976 | Fetters et al. | 525/271 |
| 3,993,613 | 11/1976 | Doss et al. | 525/92 |
| 4,086,298 | 4/1978 | Fahrbach et al. | 525/314 |
| 4,145,298 | 3/1979 | Trepka | 252/51.5 A |
| 4,238,202 | 12/1980 | Trepka et al. | 44/332 |
| 4,391,949 | 7/1983 | St. Clair | 525/99 |
| 4,849,481 | 7/1989 | Rhodes et al. | 525/314 |
| 5,147,939 | 9/1992 | Hellermann et al. | 525/314 |
| 5,212,249 | 5/1993 | Richie et al. | 525/105 |

FOREIGN PATENT DOCUMENTS 0314256  5/1989  European Pat. Off.

*Primary Examiner*—James J. Seidleck
*Assistant Examiner*—M. L. Warzel
*Attorney, Agent, or Firm*—Keith M. Tackett

[57] ABSTRACT

A method for preparing asymmetric radial polymers wherein the different polymeric arms are contacted sequentially with a coupling agent. The method narrows the relative arm distribution of the several asymmetric radial polymers produced and significantly increases the amount of total product having the desired ratio of polymeric arms. Any coupling agent known in the prior art to be useful in the production of asymmetric radial polymers may be used in the method of this invention but coupling agents having from three to about twelve functional groups are most effective.

12 Claims, No Drawings

METHOD FOR PREPARING ASYMMETRIC RADIAL COPOLYMERS HAVING FOUR FIRST ARMS AND TWO SECOND ARMS

BACKGROUND OF THE INVENTION

1. Field of the Invention

This invention relates to a method for preparing polymers. More particularly, this invention relates to a method for preparing asymmetric radial polymers.

2. Prior Art

Heretofore, several methods have been proposed for preparing asymmetric radial polymers. As is well known in the prior art, radial polymers comprise three or more arms extending outwardly from a nucleus. The asymmetric radial polymers, generally, contain arms of at least two different polymers, which polymers may vary as to chemical composition, structure and/or molecular weights. Asymmetric radial polymers having arms of different molecular weights are sometimes referred to as polymodal polymers. A principal difference in the methods frequently used to prepare both asymmetric and polymodal radial polymers resides in the selection of a coupling agent which forms the nucleus of the radial polymer. The coupling agent may contain a fixed, though sometimes variable, number of functional sites such as the coupling agents taught in U.S. Pat. Nos. 3,281,383; 3,598,884; 3,639,517; 3,646,161; 3,993,613 and 4,086,298 or the coupling agent may itself be a monomer which polymerizes during the coupling reaction such as taught in U.S. Pat. No. 3,985,830.

In general, and when an asymmetric polymer is prepared using one of the methods heretofore proposed, a blend of polymeric arms is first prepared containing the various polymeric arms in the desired ratio and the blend of polymeric arms is then added to the coupling agent or the coupling agent is added to the blend of polymeric arms. These methods do, then, result in the production of a product having, on average, the desired number of each kind of arm in the asymmetric polymer. The real problem associated with producing asymmetric polymers in this fashion, however, is that the product obtained is in actuality a statistical distribution of all possible products which is represented by the equation:

Mole Fract. $(SI_1)_{x_i}(I_2)_{y_i} =$ $$\left( \frac{[SI_1]}{[SI_1] + [I_2]} \right)^{x_i} \left( \frac{[I_2]}{[SI_1] + [I_2]} \right)^{y_i} \left( \frac{(x_i + y_i)!}{x_i! y_i!} \right)$$

for a polymer having the average composition $(SI)_x(I)_y$, where each polymer component is designated as $(SI_1)_{x-i}(I_2)_{y_i}$ wherein $SI_1$ represents polystyrene-polyisoprene-copolymer arms and $I_2$ represents polyisoprene homopolymer arms on the radial polymer, and the quantities enclosed in brackets refer to molar quantities.

For example, if one sought to produce an asymmetric radial polymer having three homopolymer arms and one copolymer arm using silicon tetrachloride as the coupling agent by the methods heretofore proposed, a blend of polymeric arms comprising both living homopolymers and living copolymers in a ratio of three to one would be combined with the silicon tetrachloride and the coupling reaction allowed to proceed to completion. The resulting asymmetric polymer would, of course, on average contain three homopolymer arms per copolymer arm. The actual product obtained would, however, be a blend of radial polymers, some of which contain four homopolymer arms and no copolymer arms, some of which contain three homopolymer arms and one copolymer arm (the desired product), some of which contain two homopolymer arms and two copolymer arms, some of which contain one homopolymer and three copolymer arms and some of which contain no homopolymer arms and four copolymer arms. The expected statistical distribution for an asymmetric radial copolymer having the average composition $(SI)—X—I_3$ made in this manner, wherein X is silicon, is given in Table 1. To the extent that an asymmetric radial copolymer containing three homopolymer arms and one copolymer arm was particularly well suited for a particular end use application while radial polymers containing less than three homopolymer arms were not particularly well suited, the blend actually obtained would not, then perform as well as desired in this particular end use application.

TABLE 1

Calculated Statistical Distribution of Polymer Components for the Asymmetric Radial Polymer Having a 3:1 Arm Ratio

| Polymer Component | % Mole |
|---|---|
| $(SI)_4—X$ | 0.39 |
| $(SI)_3—X—I$ | 4.69 |
| $(SI)_2—X—I_2$ | 21.09 |
| $(SI)—X—I_3$ | 42.19 |
| $I_4—X$ | 31.64 |

Similarly, if one sought to produce an asymmetric radial polymer having four homopolymer arms and two copolymer arms using bis(trichloro)silylethane as the coupling agent by the methods heretofore proposed, the synthetic method would be as described above except that a blend of polymeric arms comprising both living homopolymers and living copolymers in a ratio of four to two would be coupled by reaction with the bis(trichloro)silylethane. The resulting asymmetric polymer would, of course, on average contain four homopolymer arms and two copolymer arms, but the actual product obtained should have the distribution of components shown in Table 2.

Recently, it has been discovered that the presence of an asymmetric radial polymer composed of a single polymer component of precise architecture frequently does, indeed, lead to better performance in many end use applications. This is particularly important when an asymmetric radial polymer containing a certain arm ratio may give rise to deleterious properties in an application. The need, then, for an improved process for preparing asymmetric radial polymers offering precise control of the number and type of polymer arms in the product is believed to be readily apparent.

TABLE 2

Calculated Statistical Distribution of Polymer Components for the Asymmetric Radial Polymer Having a 4:2 Arm Ratio

| Polymer Component | % Mole |
|---|---|
| $(SI)_6—X$ | 0.13 |
| $(SI)_5—X—I$ | 1.65 |
| $(SI)_4—X—I_2$ | 8.23 |
| $(SI)_3—X—I_3$ | 21.95 |
| $(SI)_2—X—I_4$ | 32.92 |
| $(SI)—X—I_5$ | 26.34 |
| $I_6—X$ | 8.78 |

SUMMARY OF THE INVENTION

It has now been discovered that the foregoing and other disadvantages of the prior art processes for preparing asymmetric polymers can be avoided or at least significantly reduced with the method for preparing asymmetric radial polymers of this invention and an improved process for preparing asymmetric radial polymers provided thereby. It is therefore, an object of this invention to provide an improved process for preparing asymmetric radial polymers. It is another object of this invention to provide such an improved process wherein the relative distribution of arms within the polymer is controlled within a narrower range. It is yet another object of this invention to provide such an improved process wherein the production of asymmetric radial polymers having relative arm distributions which are not beneficial in any given end use application are either eliminated or at least significantly reduced. The foregoing and other objects and advantages will become apparent from the description of the invention set forth hereinafter and from the examples included therein.

In accordance with the present invention, the foregoing and other objects and advantages are accomplished with a process wherein the different arms to be contained in the asymmetric radial polymer are contacted sequentially with the coupling agent. Generally, the coupling sequence will be controlled by the relative number of each arm sought in the final product with that polymer intended to provide the greater number of arms contacted with the coupling agent first and that polymer intended to provide the next greatest number of arms contacted with the coupling agent second. To the extent that all of the arms are intended to be present in the asymmetric radial polymer product in equal numbers the order of addition is immaterial.

DETAILED DESCRIPTION OF THE INVENTION

As indicated supra, the present invention is drawn to an improved process for making asymmetric radial polymers. As also indicated supra, asymmetric radial polymers contain a plurality (three or more) of arms of at least two different polymers. The polymeric arms may differ as to chemical composition, structure and/or molecular weight. In the process of the present invention, the different arms are contacted sequentially with the coupling agent. When the number of arms of one polymer is intended to be present in the asymmetric radial polymer product in a greater number than one or more other polymers, the polymer intended to be present in the greater number will be contacted with the coupling agent first. It will of course be appreciated that the polymer intended to provide the greater number of arms in the asymmetric polymer product could be a mixture of different polymers. After reaction of the arms intended to be present in the greater number with the coupling agent is complete or at least substantially complete, the product therefrom will be contacted with the arm intended to be present in the next greatest number and this reaction allowed to proceed until completed or at least substantially completed. When two or more arms are intended to be present in equal number, the order of contacting with the coupling agent is not critical and each of the arms may be added in any order (sequence).

In general, the method of this invention may be used to prepare asymmetric radial polymers with any polymer containing a reactive end group which will react with one or more functional groups contained in a selected coupling agent. The method is particularly suitable for the preparation of asymmetric radial polymers from so-called "living" polymers containing a single terminal metal ion. The coupling agent used in the preparation must, then, contain at least three functional groups which will react with the polymer at the site of the metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of asymmetric radial polymers using "living" polymers to form the arms thereof, the invention will be described by reference to such polymers. It will, however, be appreciated that the invention would be equally useful with polymers having different reactive groups so long as the selected coupling agent contains functional groups which are reactive with the reactive site contained in the polymer.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202, the disclosure of which patents are herein incorporated by reference. In general, the polymers produced with the processes taught in the foregoing patents may be polymers of one or more conjugated dienes containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like, preferably those conjugated diolefins containing 4 to 8 carbon atoms. In accordance with the disclosure of at least certain of these patents, one or more of the hydrogen atoms in the conjugated diolefins may be substituted with halogen. The polymers produced by these processes may also be copolymers of one or more of the aforementioned conjugated diolefins and one or more other monomers particularly monoalkenyl aromatic hydrocarbon monomers such as styrene, various alkyl-substituted styrenes, alkoxy-substituted styrenes, vinyl naphthalene, vinyl toluene and the like. Homopolymers and copolymers of monoalkenyl aromatic hydrocarbons can also be prepared by the methods taught in the aforementioned patents, particularly the methods taught in U.S. Pat. Nos. 3,150,209; 3,496,154; 3,498,960; 4,145,298 and 4,238,202. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in both the method of this invention and the asymmetric radial polymer of this invention may be prepared by contacting the monomer or monomers with an organoalkali metal compound in a suitable solvent at a temperature within the range from about $-150°$ C. to about $300°$ C., preferably at a temperature within the range from about $0°$ C. to about $100°$ C. Particularly effective polymerization initiators are organolithium compounds having the general formula:

$$RLi$$

Wherein:

R is an aliphatic, cycloaliphatic, alkyl-substituted cycloaliphatic, aromatic or alkyl-substituted aromatic hydrocarbon radial having from 1 to about 20 carbon atoms.

In general, the polymers useful as arms in both the method of this invention and the asymmetric radial polymer of this invention will have a weight-average molecular weight within the range from about 1000 to about 500,000 and when the polymer is a copolymer of one or more conjugated diolefins and one or more other monomers, the copolymer will comprise from about 1 wt % to about 99 wt % monomeric diolefin units and from about 99 wt % to about 1 wt % monoalkenyl aromatic hydrocarbon monomer units. In general, the different polymer arms will be prepared separately and maintained separately until each is sequentially contacted with the coupling agent.

In general, any of the coupling agents known in the prior art to be useful in forming a radial polymer by contacting the same with a living polymer may be used in both the method of this invention and the asymmetric radial polymers of this invention. In general, suitable coupling agents will contain three or more functional groups which will react with the living polymer at the metal-carbon bond. While the method of the present invention will, theoretically, at least, improve the relative distribution of different arms in an asymmetric radial polymer having any number of arms, the method offers significant improvement when the coupling agent contains from three to about twelve functional groups reactive with the metal-carbon bond of the "living" polymer. Suitable coupling agents, then, include $SiX_4$, $RSiX_3$, $HSiX_3$, $X_3Si—SiX_3$, $X_3Si—O—SiX_3$, $X_3Si—(CH_2)_x—SiX_3$, $R—C(SiX_3)_3$, $R—C(CH_2SiX_3)_3$, $C(CH_2SiX_3)_4$ and the like, particularly those containing from three to about six functional groups. In the foregoing formulae: each X may, independently, be fluorine, chlorine, bromine, iodine, alkoxide radicals, carboxylate radicals, hydride and the like; R is a hydrocarbyl radical having from 1 to about 10 carbon atoms, preferably from 1 to about 6 carbon atoms; and x is a whole number from 1 to about 6. Particularly useful coupling agents include the silicon tetrahalides such as silicon tetrafluoride, silicon tetrachloride, silicon tetrabromide and the like.

In general, the living polymers used as arms in the asymmetric radial polymer will be contacted with the coupling agent at a temperature within the range from about 0° C. to about 100° C. at a pressure within the range from about 0 psig to about 100 psig and the contacting in each step will be maintained until reaction between the arms and the coupling agent is complete or at least substantially complete, generally for a period of time within the range from about 1 to about 180 minutes. While the inventor does not wish to be bound by any particular theory, it is believed that the method of this invention results in an improved relative arm distribution because the reactivity of the functional groups contained in the coupling agent become progressively less active as the number of functional groups contained in the coupling agent is reduced as the result of reaction with the metal-carbon bond contained in the living polymer. Further, it is believed that this reduction in activity is caused primarily by steric hinderance resulting from the progressive incorporation of polymer segments onto the coupling agent. The last functional site remaining on the coupling agent would, then, be the least reactive no matter how many functional groups the coupling agent initially contained. As a result, when only a portion of the total number of arms to be contained in the asymmetric radial polymer is initially contacted with the coupling agent, the arms would have readier access to the more reactive functional groups and would, then, react predominantly at these groups. Similarly, the next portion of arms contacted with the partially reacted coupling agent would again be more likely to react with the more reactive of the remaining functional groups until such time as all of the functional groups were reacted. This difference in reactivity, then, when coupled with sequential addition of the different arms greatly enhances the probability that each asymmetric radial polymer formed will have the desired number of each arm. The method of the present invention is particularly useful for the production of an asymmetric radial polymer wherein a single arm of a particular polymer is desired. This arm would then be contacted last and would then react with the least reactive of the functional groups in the coupling agent. When all of the polymer arms are combined and contacted simultaneously with the coupling agent, on the other hand, the distribution of the different arms on each of the asymmetric radial polymers formed will be random and can range from polymers having all arms of one type of polymer to all arms of another type of polymer as shown in Tables 1 and 2.

In general, the polymers useful as arms in the asymmetric radial polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cylohexane, cycloheptane and the like, alkyl-substituted cycloaliphatic hydrocarbons such as methylcyclohexane, methylcycloheptane and the like, aromatic hydrocarbons such as benzene and alkyl-substituted aromatic hydrocarbons such as toluene, xylene and the like and ethers such as tetrahydrofuran, diethylether, di-n-butyl ether and the like. Since the polymers useful in making the asymmetric radial polymers of this invention will contain a single terminal reactive group, the polymers used in preparation of the asymmetric radial polymers will be retained in solution after preparation without deactivating the reactive (living) site. In general, the coupling agent may be added to a solution of the polymer or a solution of the polymer may be added to the coupling agent.

The method of preparing the asymmetric radial polymers of this invention will comprise a plurality of steps. In the first step, a polymer containing a single terminal reactive group will be contacted with a coupling agent containing a plurality of functional groups which are reactive with the terminal group of the polymer. In a second step, the reaction product from the first step will be combined with a solution of a second polymer which is different from the polymer used in the first step. The difference may be in chemical composition, relative chemical composition, structure, molecular weight or the like. In the second step, contacting between the second polymer and the reaction product from the first step will be continued until reaction between the second polymer and the remaining functional groups of the coupling agent is complete or at least substantially complete. In all except the last step of the preparation, it will be important to control the amount of polymer contacted with the coupling agent such that, on average, the desired number of such arms are incorporated into the nucleus of each of the asymmetric radial polymers actually formed. In the final step, careful control of the amount of polymer used is not as important so long as a sufficient amount of polymer to react with all of the remaining functional groups in the coupling agent is used. To the extent that the polymer used is not readily separable from the asymmetric radial polymer, however, and to the extent that the presence of such a polymer in the final product is undesirable, care should be exercised to ensure that a stoichiometric amount of the last polymer, relative to the remaining functional groups, is used.

The asymmetric radial polymers of this invention may be used in any of the applications for which asymmetric radial polymers having the same average relative arm structure can be used. Suitable end use applications, then, include impact modification of engineering thermoplastics, impact modification of unsaturated thermosetting polyesters, adhesives and the like.

PREFERRED EMBODIMENTS

In a first preferred embodiment of the present invention, the process of this invention will be used to prepare an asymmetric radial polymer having four arms. The arms will be, partly, polymers containing only conjugated diolefins, most preferably conjugated diolefin homopolymers and, partly, block copolymers containing at least one monoalkenyl aromatic hydrocarbon polymer block and at least one conjugated diolefin polymer block. In a most preferred embodiment, the block copolymer will comprise a single polystyrene block and a single polybutadiene or polyisoprene block. The weight-average molecular weight of those polymeric arms containing only polymerized conjugated diolefins will be within the range from 1,000 to about 150,000, preferably from about 15,000 to about 150,000. The weight-average molecular weight of the monoalkenyl aromatic hydrocarbon polymer blocks will be within the range from about 5,000 to about 100,000 and the weight-average molecular weight of the conjugated diolefin polymer blocks will be within the range from about 15,000 to about 150,000. Both the conjugated diolefin polymer arms and the block copolymer arms will be living polymers containing a single lithium atom bonded to a terminal carbon atom. In the first preferred embodiment, any of the known coupling agents containing four functional groups which are reactive with the lithium-carbon bond may be used. In a most preferred embodiment, the coupling agent will be silicon tetrachloride. In a most preferred embodiment of the present invention, the ratio of conjugated diolefin homopolymer arms to the styrene-butadiene or styrene-isoprene block copolymer arms will be 3:1.

In the first preferred embodiment, and when the asymmetric radial polymer is intended to contain an average of three of one type of polymer arms to one of the other, the polymer intended to constitute the three arms will be contacted with the coupling agent first and the reaction between the lithium-carbon bond and the functional groups allowed to proceed either to completion or at least to substantial completion. When the polymer is intended to contain two of both kinds of arms, either polymer may be first contacted with the coupling agent. In the first preferred embodiment, the sequential coupling reactions will be completed at a temperature within the range from 20° C. to about 80° C., preferably from about 50° C. to about 80° C., at a pressure within the range from about 0 psig to about 30 psig with a nominal holding time within the range from 10 to about 100 minutes, preferably from about 20 to about 100 minutes. Ethers such as glyme, diethylether, dimethoxybenzene, or tetramethylene ethylenediamine are added before the second coupling step to accelerate the reaction between the last halogen on each silicon atom and the terminal functional group on the second polymeric arms. Stoichiometric quantities of all reactants will be used in each step.

In a second preferred embodiment of the present invention, the process of this invention is used to prepare an asymmetric radial polymer having at least 75% by weight of six arm radial polymer molecules having a ratio of first arms to second arms of 4:2. The arms will be, partly, polymers containing only conjugated diolefins, most preferably conjugated diolefin homopolymers and, partly, block copolymers containing at least one monoalkenyl aromatic hydrocarbon polymer block and at least one conjugated diolefin polymer block. In a most preferred embodiment, the block copolymer will comprise a single polystyrene block and a single polybutadiene or polyisoprene block. The weight-average molecular weight of those polymeric arms containing only polymerized conjugated diolefins will be within the range from 1,000 to about 150,000, preferably from about 15,000 to about 150,000. The weight-average molecular weight of the monoalkenyl aromatic hydrocarbon polymer blocks will be within the range from about 5,000 to about 100,000 and the weight-average molecular weight of the conjugated diolefin polymer blocks will be within the range from about 15,000 to about 150,000. Both the conjugated diolefin polymer arms and the block copolymer arms will be living polymers containing a single lithium atom bonded to a terminal carbon atom. In the second preferred embodiment, any of the known coupling agents containing six functional groups which are reactive with the lithium-carbon bond may be used. In a most preferred embodiment, the coupling agent will be bis(trichlorosilyl)ethane which has the formula $Cl_3Si-(CH_2)_2-SiCl_3$. In a most preferred embodiment of the present invention, the ratio of conjugated diolefin homopolymer arms to the styrene-butadiene or styrene-isoprene block copolymer arms will be 4:2.

In the second preferred embodiment, and when the asymmetric radial polymer is intended to contain four of one type of polymer arms to two of the other, the polymer intended to constitute the most arms will be contacted with the coupling agent first and the reaction between the lithium-carbon bond and the functional groups allowed to proceed to completion. When the polymer is intended to contain three of both kinds of arms, either polymer may be first contacted with the coupling agent. In the second preferred embodiment, the sequential coupling reactions will be completed at a temperature within the range from 20° C. to about 80° C., preferably from about 50° C. to about 80° C., at a pressure within the range from about 0 psig to about 30 psig with a nominal holding time within the range from 10 minutes to about 100 minutes, preferably from about 20 to about 100 minutes. Ethers such as glyme, diethylether, dimethoxybenzene, or tetramethylene ethylenediamine are added before the second coupling step to accelerate the reaction between the last halogen on each silicon atom and the terminal functional group on the second polymeric arms. Stoichiometric quantities of all reactants will be used in each step.

Having thus broadly described the present invention and a preferred and most preferred embodiments thereof, it is believed that the invention will become even more apparent by reference to the following examples. It will be appreciated, however, that the examples are presented solely for the purposes of illustration and should not be construed as limiting the invention.

EXAMPLES

Example 1

In this example, an asymmetric radial polymer within the scope of the present invention containing, on average, three homopolymer arms and one block copolymer arm was prepared. The homopolymer arm was a polybutadiene having a weight-average molecular weight of 44,800. The block copolymer was a block copolymer comprising a single polystyrene block having a weight-average molecular weight of 18,000 and a single polybutadiene block having a weight-average molecular weight of 41,600. In the first step of the preparation, a sufficient amount of a living polybutadiene polymer to provide three moles of living polymer per mole of silicon tetrachloride was contacted with silicon tetrachloride at a temperature of 60° C. and at ambient pressure. The living polymer was dissolved in cyclohexane at a concentration of 12 wt % of polybutadiene and the contacting was accomplished by adding the silicon tetrachloride to the polymer solution. The contacting was maintained for 30 minutes with mild agitation. After reaction of the living polybutadiene polymer and the silicon tetrachloride was complete, a sufficient amount of a living styrene-butadiene block copolymer was added to the solution to provide one mole of block copolymer per mole of silicon tetrachloride initially in solution. Contacting between the block copolymer and the reaction product from the first step was continued for 30 minutes at the same conditions used during the first contacting step. After reaction of the block copolymer and the coupling agent was completed, the asymmetric radial polymer was recovered and analyzed to determine the relative amount of radial polymer containing no homopolymer arms, one homopolymer arm, two homopolymer arms, three homopolymer arms and four homopolymer arms. The results obtained are summarized in the Table 3 which compares the results to the calculated distribution from Table 1.

TABLE 3

| Number of Homopolymer Arms | % of Radial Polymer With # of Homopolymer Arms Indicated | |
|---|---|---|
| | Method of this Invention | Prior Art Method |
| 0 | 0 | <1 |
| 1 | 0 | 5 |
| 2 | 5 | 21 |
| 3 | 86 | 42 |
| 4 | 9 | 32 |

As will be apparent from the data summarized in Table 3, the method of this invention more than doubled the amount of polymer produced having the desired ratio of arms; viz., three homopolymer arms and one copolymer arm (86% vs. 42%). As will also be apparent from the data summarized in the preceding Table, the method of this invention resulted in a product containing only 5% of polymer molecules having two or more copolymer arms while the prior art method results in a product containing greater than 26% of polymer molecules having two or more copolymer arms. It is important, particularly in some impact modification end uses, that polymers containing two or more copolymer arms be minimized. The method of the present invention is, then, quite effective in narrowing the relative distribution of the arms in the asymmetric radial polymer produced.

Example 2

In this example, an asymmetric radial polymer within the scope of the present invention containing four homopolymer arms and two block copolymer arm was prepared. The homopolymer arm was a polyisoprene having a weight-average molecular weight of 29,000 g/mole. The block copolymer was a block copolymer comprising a single polystyrene block having a weight-average molecular weight of 10,600 and a single polyisoprene block having a weight-average molecular weight of 19,100. In the first step of the preparation, a sufficient amount of a living polyisoprene polymer to provide four moles of living polymer per mole of bis(trichlorosilyl)ethane was contacted with bis(trichlorosilyl)ethane at a temperature of 60° C. and at ambient pressure. The living polymer was dissolved in cyclohexane at a concentration of 15 wt % of polyisoprene and the contacting was accomplished by adding the bis(trichlorosilyl)ethane to the polymer solution. The contacting was maintained for 75 minutes with mild agitation.

After reaction of the living polyisoprene polymer and the coupling agent was complete, a sufficient amount of a living styrene-isoprene block copolymer was added to the solution to provide two moles of block copolymer per mole of bis(trichlorosilyl)ethane initially in solution, along with 300 ppm ortho-dimethoxybenzene on a total solution basis. Contacting between the block copolymer and the reaction product from the first step was continued for 3 hours at the same conditions used during the first contacting step except that the temperature was 70° C.

After reaction of the block copolymer and the coupling agent was completed, the asymmetric radial polymer was recovered and analyzed to determine the polymer composition. The results obtained for the radial polymer components are summarized in Table 4 in comparison to the calculated results from Table 2.

TABLE 4

| Number of Homopolymer Arm | % of Six Arm Radial Polymer With # of Homopolymer Arms Indicated | |
|---|---|---|
| | Method of this Invention | Prior Art Method |
| 0 | 0 | <1 |
| 1 | 0 | 1.6 |
| 2 | 0 | 8 |
| 3 | 0 | 22 |
| 4 | 100 | 33 |
| 5 | 0 | 26 |
| 6 | 0 | 9 |

From the data summarized in the preceding Table, the method of this invention results in a polymer composition containing six-arm radial polymers having exclusively the desired 4:2 arm ratio. No other six-arm asymmetric radial polymers are produced. Preparation of a similar polymer by the prior art method should result in a distribution of six-arm radial polymer components containing about 33% of the desired 4:2 asymmetric radial copolymer. The method of the present invention is, then, very effective in producing a precisely controlled asymmetric radial polymer.

Example 3

In this example, an asymmetric radial polymer containing four homopolymer arms and two block copolymer arms was prepared according to the procedure of Example 2, with the following changes. The homopolymer arm was a polyisoprene having a weight-average molecular weight of 16,000. The block copolymer comprised a single polystyrene block having a weight-average molecular weight of 15,000 and a single polyisoprene block having a weight-average molecular weight of 23,000. The first coupling step was run at 60° C. for 60 minutes. The second coupling step was run at 70° C. for 24 hours in the presence of 300 ppm glyme on a total solution basis. After preparation of the asymmetric radial polymer, it was analyzed to determine the polymer composition. The results obtained are summarized in Table 5 for comparison of linear and radial components with other six arm radial polymers.

Example 4

In this example, an asymmetric radial polymer containing four homopolymer arms and two block copolymer arms was prepared according to the procedure of Example 2, with the following changes. The homopolymer arm was a polyisoprene having a weight-average molecular weight of 3,800. The block copolymer comprised a single polystyrene block having a weight-average molecular weight of 6000 and a single polybutadiene block having a weight-average molecular weight of 23,400. The first coupling step was run at 65° C. for 30 minutes. The second coupling step was run at 65° C. for 60 minutes in the presence of 300 ppm glyme on a total solution basis. After preparation of the asymmetric radial polymer, it was analyzed to determine the polymer composition. The results obtained are summarized in Table 5.

Example 5

In this example, an asymmetric radial polymer containing four homopolymer arms and two block copolymer arms was prepared according to the procedure of Example 2. The homopolymer arm was a polyisoprene having a weight-average molecular weight of 3,800. The block copolymer comprised a single polystyrene block having a weight-average molecular weight of 6,000 and a single polyisoprene block having a weight-average molecular weight of 23,500. The first coupling step was run at 65° C. for 30 minutes. The second coupling step was run at 60° C. for 60 minutes in the presence of 300 ppm glyme on a total solution basis. After preparation of the asymmetric radial polymer, it was analyzed to determine the polymer composition. The results obtained are summarized in Table 5.

TABLE 5

Composition of Six-Arm Asymmetric Radial Polymers Prepared Using the Method of This Invention[a]

| Example Number | % wt 6-arm asymmetric radial polymer[b] | % wt 5-arm asymmetric radial polymer[c] | % wt diblock copolymer | % wt homopolymer |
|---|---|---|---|---|
| 2 | 83.6 | 0 | 14.9 | 1.5 |
| 3 | 85.5 | 10.8 | 1.8 | 3.4 |
| 4 | 79 | 17.5 | 0 | 0 |
| 5 | 77 | 18.9 | 0 | 0 |

[a]Determined by Gel Permeation Chromatography.
[b]All asymmetric radial polymer which is obtained by coupling of two block copolymer arms and four homopolymer arms.
[c]All asymmetric radial polymer which is obtained by coupling of one block copolymer arm and four homopolymer arms.

From the data summarized in the preceding Table, the method of this invention results in a polymer composition containing almost exclusively the desired six-arm asymmetric radial polymer. Some five-arm radial polymer was produced indicating that the copolymer arms reacted to completion prior to reaction with all chlorine atoms on the coupling agent. The presence of linear diblock results from an excess of the copolymer arms. Both five-arm radial polymers and linear diblock polymers are produced in the prior art method when the amount of reagents is not carefully controlled.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the invention, what is claimed is:

1. A method for preparing an asymmetric radial polymer comprising the steps of:
  (a) contacting a first conjugated diene polymer having a single reactive end group per molecule with a coupling agent containing six functional groups which will react with the reactive end group such that said first conjugated diene polymer reacts with four of the functional groups on each molecule of the coupling agent;
  (b) contacting a second conjugated diene polymer having a single reactive end group per molecule with the reaction product from step (a) under conditions such that reaction between said second polymer and the reaction product from step (a) proceeds substantially to completion; and
  (c) recovering an asymmetric radial polymer having at least 75% by weight of six-arm radial polymer molecules having a ratio of four polymeric arms from the first conjugated diene polymer to two polymeric arms from the second conjugated diene polymer.

2. The method of claim 1 wherein the coupling agent comprises six halogen functional groups.

3. The method of claim 2 wherein the first conjugated diene polymer comprises living isoprene homopolymer and the second conjugated diene polymer comprises living polystyrene-polyisoprene diblock copolymers.

4. The method of claim 3 wherein said coupling agent contains six chlorine functional groups.

5. The method of claim 4 wherein said coupling agent is $Cl_3Si-(CH_2)_2-SiCl_3$.

6. The method of claim 5 wherein the living isoprene homopolymers have weight average molecular weights from 1,000 to 150,000, the living block copolymers have weight average molecular weights from 1,000 to 150,000.

7. An asymmetric radial polymer prepared with a method comprising the steps of:
(a) contacting a first conjugated diene polymer having a single reactive end group per molecule with a coupling agent containing six functional groups which will react with the reactive end group such that said first conjugated diene polymer reacts with four of the functional groups on each molecule of the coupling agent;
(b) contacting a second conjugated diene polymer having a single reactive end group per molecule with the reaction product from step (a) under conditions such that reaction between said second polymer and the reaction product from step (a) proceeds substantially to completion; and
(c) recovering an asymmetric radial polymer having at least 75% by weight of six-arm radial polymer molecules having a ratio of four polymeric arms from the first conjugated diene polymer to two polymeric arms from the second conjugated diene polymer.

8. The asymmetric radial polymer of claim 7 wherein the coupling agent comprises six halogen functional groups.

9. The asymmetric radial polymer of claim 8 wherein the first conjugated diene polymer comprises living isoprene homopolymer and the second conjugated diene polymer comprises living polystyrene-polyisoprene diblock copolymers.

10. The asymmetric radial polymer of claim 9 wherein said coupling agent contains six chlorine functional groups.

11. The asymmetric radial polymer of claim 10 wherein said coupling agent is $Cl_3Si-(CH_2)_2-SiCl_3$.

12. The asymmetric radial polymer of claim 11 wherein the living isoprene homopolymers have weight average molecular weights from 1,000 to 150,000, the living block copolymers have weight average molecular weights from 1,000 to 150,000.

* * * * *